United States Patent [19]

Shimizu et al.

[11] 3,836,432
[45] Sept. 17, 1974

[54] CONTINUOUS PROCESS FOR THE HYDROLYSIS OF RAFFINOSE

[75] Inventors: Junichi Shimizu; Toshio Kaga, both of Tokyo, Japan

[73] Assignee: Hokkaido Sugar Company, Ltd., Tokyo, Japan

[22] Filed: Sept. 2, 1971

[21] Appl. No.: 177,477

Related U.S. Application Data

[62] Division of Ser. No. 860,876, Sept. 25, 1969, Pat. No. 3,664,927.

[52] U.S. Cl................... 195/11, 195/31, 195/115
[51] Int. Cl............................................ C12b 1/00
[58] Field of Search ............... 195/31, 11, 141, 115

[56] References Cited
UNITED STATES PATENTS

| | | | |
|---|---|---|---|
| 3,594,325 | 7/1971 | Feierstein | 195/63 R |
| 3,647,625 | 3/1972 | Suzuki et al. | 195/11 |
| 3,650,967 | 3/1972 | Johnson | 195/63 R |

OTHER PUBLICATIONS

Perlman, et al., Fermentation Advances, p. 495–500, 504, (1969).
Steel, et al., Canadian Journal of Microbiology, Vol. 1, p. 150–157, (1955).

*Primary Examiner*—A. Louis Monacell
*Assistant Examiner*—Thomas G. Wiseman
*Attorney, Agent, or Firm*—Sughrue, Rothwell, Mion, Zinn & Macpeak

[57] ABSTRACT

A continuous process for hydrolyzing raffinose contained in beet sugar syrup or juice with an enzyme agent containing α-D-galactosidase, wherein as said enzyme agent the mycelial pellet of *Mortierella Vinacea* varient raffinose utilizer (hereinafter denoted as "enzyme pellet") is used, wherein α-D-galactosidase is present in the cells of the mold. By "enzyme pellet" is meant the mycelial pellet of Mortierella vinacea raffinoise utilizer containing α-D-galactosidase.

An apparatus for carrying out the above said process, comprising a U-shaped open reaction vessel which is separated into plurality of chambers by boundary plates which are so constructed as to allow the sugar syrup or juice to overflow through replaceable screen nets fitted at the upper parts of the boundary plates; which is equipped with an interfering plate in each chamber; and which is equipped with stirrers in each chamber between the interfering and boundary plates.

5 Claims, 4 Drawing Figures

CONTINUOUS PROCESS FOR THE HYDROLYSIS OF RAFFINOSE

This is a division, of application Ser. No. 860,876, filed Sept. 25, 1969, now U.S. Pat. No. 3,664,927.

DETAILED DESCRIPTION OF THE INVENTION

The present invention relates to a process for continuous hydrolysis of raffinose and an apparatus therefor. More particularly it relates to a process for continuous hydrolysis of raffinose contained in beet sugar syrup or juice by stirring and contacting the syrup with $\alpha$-D-galactosidase which is present in the cells of a mold. The mold containing $\alpha$-D-galactosidase is cultured and in pellet form and the obtained enzyme pellet is added in a given amount to each chamber of the reaction vessel fitted with a stirrer as shown in FIG. 1. The beet sugar syrup or juice is contacted with the enzyme pellets for a required period by passing the syrup through the chambers from one side to another to contact the raffinose with the enzyme for the hydrolysis of raffinose, for promoting the growth of sugar crystals in the crystallization operation of the beet sugar syrup or juice and also for attaining an increased production of sugar.

Hitherto, there is known a method, in which the solution to be reacted is continuously allowed to pass downwardly through a column filled with water-insoluble enzyme combined with the cells of a mold and also another method, in which the solution to be reacted and the similar enzyme pellet as said above are simultaneously brought into a reaction vessel and after the completion of the reaction the enzyme is recovered and used for the process repeatedly.

When examining the above mentioned known methods for hydrolysis of raffinose, it was found to be impossible to apply these methods for large scale production of beet sugar. Thus, when beet sugar syrup of Bx 30° is allowed to pass downwardly through the column at 50°C which was filled with $\alpha$-D-galactosidase-enzyme pellets, the velocity of the current of the sugar syrup gradually falls and the whole enzyme pellets are compressed into a lump whereby the syrup is channeled and the efficiency of the enzyme extremely decreases. Further, when raffinose-containing sugar syrup of Bx 30° and the above said enzyme pellet are added in a reaction vessel at the same time and the mixture is reacted at 50°C for a required period, after the completion of the reaction the enzyme pellet recovered from the reacted sugar syrup is extremely reduced in its activity due to contacting of the enzyme with air during the separation treatment. Furthermore, this process can hardly be practically applied for industrial scale, because the equipment therefor is quite voluminous in size and is also expensive.

In order to overcome the above mentioned disadvantages, we have precisely studied the properties of $\alpha$-D-galactosidase-enzyme pellets and the beet sugar syrup or juice containing raffinose as well as the hydrolysis conditions of raffinose and found a novel process most suitable for the treatment of beet sugar syrup or juice containing raffinose and an apparatus therefor.

BRIEF DESCRIPTION OF THE DRAWINGS

An apparatus of the present invention and for carrying out the process of the present invention is illustrated in the accompanying drawings.

In the drawings

To accomplish the process according to the invention, a mold containing $\alpha$-D-galactosidase such as *Mortierella vinacea* variant raffinose utilizer, is cultured in a suitable nutrient culture medium containing lactose to obtain the mold of pellet-form having the activity of about 30,000 unit per ml of culture medium. After the isolation of the mold from the cultured broth it can be used as an enzyme pellet and can also be stored in a refrigerator before use.

Beet sugar syrup or juice, which is obtained in each manufacturing process of sugar by extracting sucrose from beet, contains small amount of raffinose, peculiar to the beet sugar syrup or juice and which is a trisaccharide.

In the crystallization of sugar from the beet sugar syrup or juice, raffinose contained therein behaves as a factor to obstruct the growth of sugar crystals. Accordingly, the recovery of sugar can be increased by hydrolyzing of raffinose into sucrose and galactose.

By reacting $\alpha$-D-galactosidase-enzyme pellets with raw juice, thin juice, middle juice, beet syrup, beet molasses, etc., raffinose contained therein can easily be hydrolyzed equally in each case.

From 60 to 90 percent of raffinose contained in a wide range of between 0.4 percent and 15 percent based on solid contents in each case of sugar syrup or juice can be hydrolyzed by using 150,000–20,000,000 unit of enzyme per gram of raffinose and catalyzing for ¼–1½ hours at a temperature of between 30° and 60°C and adjusting the concentration and pH-value of beet sugar syrup or juice in Bx 10°–50° and pH 4.5–7 respectively.

1,500–3,000 tons of beet are being treated per day in a beet sugar production plant and the water-soluble substances which are contained in the beet consist mainly of sugar amounts to 300–600 tons and raffinose contained in the water-soluble substances amounts to 2–4.5 tons. The process and apparatus for treating such a large amount of sugar syrup or juice with the said enzyme pellet are being quite serious factors in economical consideration.

Figure 1:
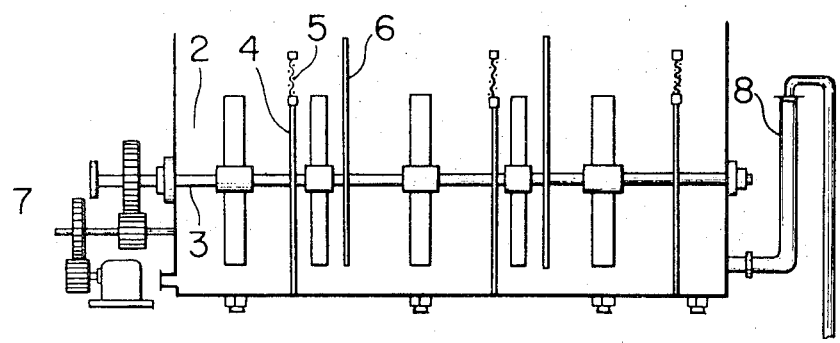
FIG. 1 is a schematic longitudinal sectional views of the reaction vessel.
Figure 1:
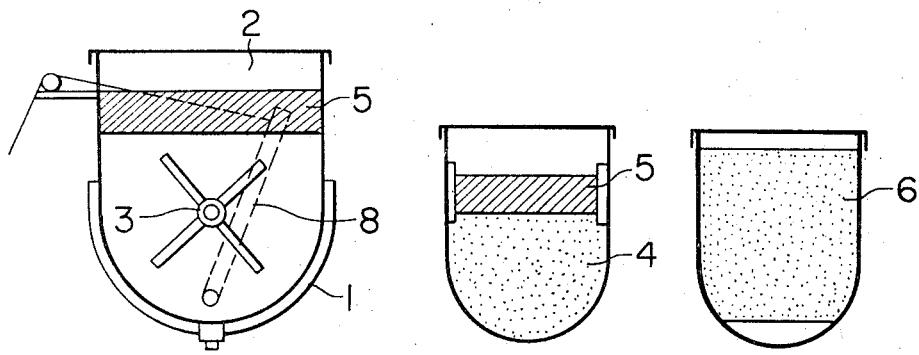
Figure 2:
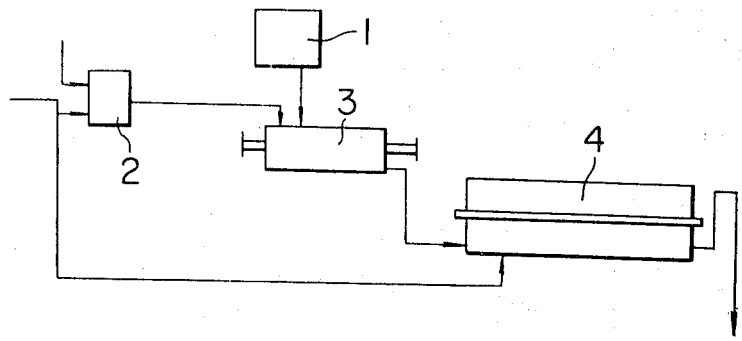
FIG. 2 is a diagrammatically illustrated process of the present invention.

The apparatus according to the invention is equipped with an agitating device as shown in FIGS. 1 and 2 to satisfy the above mentioned reaction conditions of the said enzyme pellet.

The enzyme pellet according to the invention is porous. When the enzyme pellet is immersed in a sugar syrup or juice, the apparent specific gravity of the pellets is the same as that of sugar syrup or juice. By mechanically stirring the mixture of enzyme-pellets and sugar syrup or juice, the distribution of the pellets remains constant as the concentration of sugar syrup or juice is in a range of Bx between 10° and 50°.

After regulating the concentration and pH-value in a regulating vessel the sugar syrup or juice is allowed to pass through the chambers one after another in one direction by overflow and each overflowing position above the boundary of the two adjacent chambers is fitted with a replaceable screen net of 50–100 mesh. For the sake of adjusting the mesh size of the screen net to a suitable size for the enzyme pellets which were obtained by culture and which will also be gradually abraded by contacting with sugar syrup or juice during the reaction, the screen nets are so constructed as to be able to be replaced with a net of suitable mesh.

The activity of the enzyme pellets is partially decreased by contact with sugar syrup or juice during the hydrolysis of raffinose. Accordingly, it becomes necessary to supply fresh enzyme pellets. The consumed enzyme pellets can easily be transferred to the next chamber by removing the screen net and thus the activity of the enzyme pellets in the chambers can be maintained constant.

The reaction vessel may have any number of chambers such as three or more.

The hydrolysis of raffinose according to the invention has following advantages, in detail:

1. As the hydrolysis of raffinose contained in beet sugar syrup or juice according to the invention can be carried out continuously, it is suitable for industrial large scale treatment.
2. Since the reaction can be carried out continuously, it is quite efficient and large amount of beet sugar syrup or juice can be treated by using relatively small apparatus.
3. Since contact of the syrup or juice with air is small, deactivation of the enzyme pellet caused by aerial oxidation can be avoided.
4. Regulation of the activity of the enzyme pellet is easy and control of the reaction is simple.
5. A large amount of enzyme pellet may be added freely in any chamber of the reaction vessel and so the reaction period can be reduced.
6. By using a beet sugar syrup or juice of high concentration autolysis of the enzyme can be prevented.

As mentioned above, the present invention has technically and economically attained remarkable progress in the hydrolysis of raffinose contained in beet sugar syrup or juice.

EXAMPLE

A. Apparatus

A longitudinal side sectional view of the reaction vessel is shown in FIG. 1.

A stainless steel-reaction vessel 2 fitted with jacket 1 is divided in three chambers and is equipped with a shaft of the agitator 3 passing through the central part of each chamber. Above each boundary plate 4 there is fitted a replaceable screen net 5 of mesh size between 60 and 80. In order to regulate the stream of sugar syrup or juice there is provided an interrupting plate 6 in each chamber and the lower part of which is opened to allow passing through the syrup or juice. Blades are fitted to the shaft of the agitator at the middle of each chamber and also at the middle of the space between each boundary plate and interrupting plate and their lengths are so adjusted as to extend the ends to the surface of the liquid. This is important for preventing the choking of the screen nets placed above the boundary plates with enzyme pellets and the choking is closely influenced by the revolution of the agitator. Accordingly variable driving means 7 is used for the agitator. At the end of the last chamber there is fitted a leveling pipe 8.

B. Operation

The operation is also illustrated in the accompanying drawing (FIGS. 1 and 2).

Referring now to the drawing beet sugar molasses or syrup is introduced in the diluting and regulating vessel 3 (ref. FIG. 2) and is diluted with warm water 2 up to Bx 30° and then the pH-value is adjusted with sulfuric acid to 5.2. The treated sugar syrup is supplied in the reaction vessel having substantial contents of 3.8l, 4 continuously in a rate of about 2.8–2.9l per hour. 700 g of the enzyme pellets are charged in the chambers so as to place an equal amount of enzyme pellets in each chamber and the revolution of the agitator is adjusted to 120 r.p.m. and the screen net of 60 mesh is fitted above the boundary plate of each chamber and water of 55°C is circulated in the jacket to maintain the temperature of sugar syrup at 48°–50°C constantly. The leveling pipe is so adjusted as to control the retention time of sugar syrup in the reaction vessel for one-fourth hour.

In this manner sugar syrup of Bx 30° is passed continuously through the reaction vessel for 4 days.

During this course the size of enzyme pellets becomes smaller as they abraded and the qualities of the enzyme pellet in the second and third chambers somewhat increase. When sugar syrup has been passed through the reaction vessel for 4 days, 50 percent of the enzyme pellets used is consumed.

At this time the screen net of the first chamber is removed and the remaining enzyme therein is transferred to the second and third chambers and 50 percent of the enzyme pellets corresponding to the consumed pellets is charged in the first chamber and the screen net of 60 mesh is placed at the first chamber and those of 80 mesh are placed at the second and third chambers. The same sugar syrup as said above has been passed through the reaction vessel.

C. Results a. The composition of beet molasses used is shown, as follows:

| Solid content | 85 | % |
| Sucrose | 65 | %/Bx |
| Reducing sugar | 0.5 | %/Bx |
| Raffinose | 4 | %/Bx |
| Ash | 5 | %/Bx |
| Color (Stammer Color Value) | 230 | |

By treating the sugar syrup prepared by diluting the molasses having the above mentioned composition with the said enzyme pellets according to the invention for 4 days of the first half test, 76–87 percent of raffinose can be hydrolyzed as shown in Table I.

Table I

| Time operated Day | | Time reacted (h) | Hydrolyzed sugar syrup | | Reaction conditions | |
|---|---|---|---|---|---|---|
| | | | Rate of hydrolysis of raffinose (%) | Flow out volume of syrup (l) | Temperature (°C) | Supplying rate of syrup (l/h) |
| 1st | first half | 12.0 | 87 | 35.0 | 48~50 | 2.91 |
| | second half | 12.0 | 82 | 35.0 | 48~50 | 2.91 |
| | first half | 12.0 | 80 | 35.0 | 49~50 | 2.91 |

Table I — Continued

| Time operated Day | | Time reacted (h) | Hydrolyzed sugar syrup | | Reaction conditions | |
|---|---|---|---|---|---|---|
| | | | Rate of hydrolysis of raffinose (%) | Flow out volume of syrup (l) | Temperature (°C) | Supplying rate of syrup (l/h) |
| 2nd | second half | 12.0 | 81 | 35.0 | 48~50 | 2.91 |
| 3rd | first half | 12.0 | 81 | 35.0 | 49~50 | 2.91 |
| | second half | 12.0 | 80 | 35.0 | 48~50 | 2.91 |
| 4th | first half | 12.0 | 78 | 35.0 | 49~50 | 2.91 |
| | second half | 11.0 | 76 | 32.0 | 49~50 | 2.91 |
| Sum | | 95.0 | | 277.0 | | |

The enzyme pellet shaped in a pellet form to be used is obtained by culturing *Mortierella vinacea* variant raffinose utilizer in a culture medium mainly containing lactose under aerating and stirring conditions, centrifuging the deposited mold of enzyme pellet followed by refrigerating and then remelting to dissolve out water soluble substances and again centrifuging to obtain enzyme pellets containing 67 percent of water and having the activity of 600,000 unit per gram. After the completion of the test (the first half test for 4 days) the total activity of the enzyme decreased to 48.6 percent of the initial activity, whereas the activity of the enzyme based on solid is observed to be constant. The decrease of the total activity of the enzyme to 48.6 percent of the initial activity is mainly due to the abrasion of 51.4 percent by weight of the solid part of the enzyme pellet.

Figure 3A:
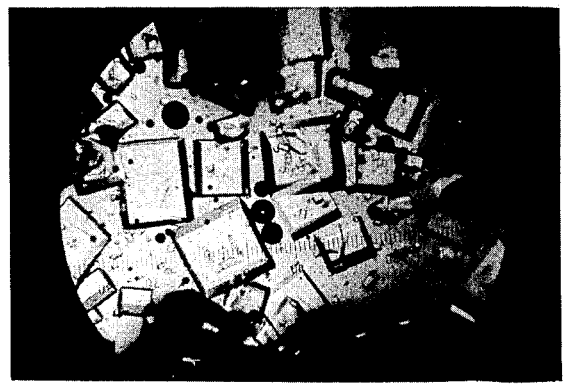
FIG. 3 is a comparison of both microscopic photographs of sugar crystals ($a$ and $b$) in which ($a$) is obtained from the sugar syrup in which raffinose contained therein was hydrolyzed according to the invention and in which ($b$) is that of contrast.
Figure 3B:
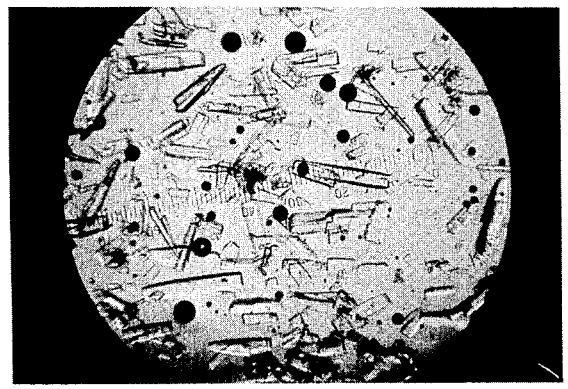

A molasses having the above mentioned composition and at the same time a molasses in which 80 percent of raffinose contained therein is hydrodysed are both treated as usually with a boiling operation and by comparing microscopic photographies of the both crystals obtained therefrom definite differences are observed between these two as shown in FIG. 3.

In the 4 days' second half test according to the invention 76–85 percent of raffinose contained in the syrup can be hydrolysed as shown in Table II.

In this manner about 80 percent of raffinose contained in the sugar syrup can be hydrolysed and it is found that 70,000–80,000 units of the enzyme are required for the hydrolysis of 1 g of raffinose.

Table II

| Time operated Day | | Time reacted (h) | Hydrolyzed sugar syrup | | Reaction conditions | |
|---|---|---|---|---|---|---|
| | | | Rate of hydrolysis of raffinose (%) | Flow out volume of syrup (l) | Temperature (°C) | Supplying rate of syrup (l/h) |
| 5th | first half | 12.0 | 85 | 35.0 | 48~50 | 2.91 |
| | second half | 12.0 | 83 | 35.0 | 49~50 | 2.91 |
| 6th | first half | 12.0 | 84 | 35.0 | 50~50 | 2.91 |
| | second half | 12.0 | 80 | 35.0 | 49~50 | 2.91 |
| 7th | first half | 12.0 | 78 | 35.0 | 48~50 | 2.91 |
| | second half | 12.0 | 79 | 35.0 | 49~50 | 2.91 |
| 8th | first half | 12.0 | 78 | 35.0 | 48~50 | 2.91 |
| | second half | 8.0 | 76 | 23.3 | 49~50 | 2.91 |
| Sum | | 92.0 | | 268.3 | | |

What is claimed is:

1. A continuous process for the continuous hydrolysis of raffinose contained in beet sugar syrup or juice with α-D-galactosidase produced by a mold which is *Mortierella vinacea* variant raffinose utilizer in pellet form, which comprises continuously contacting enzyme pellets containing α-D-galactosidase accumulated in the mycelium of the mold with said syrup or juice at a pH ranging from 4.5 to 7 in a vessel with stirring to hydrolyse continuously the raffinose in said syrup or juice, and continuously removing syrup or juice with hydrolysed raffinose and supplying syrup or juice with raffinose which has not been hydrolysed.

2. A process according to claim 1 wherein the concentration of the syrup or juice is Bx 10°–50°.

3. A process according to claim 1 wherein temperature od the syrup or juice is between room temperature and 60°C.

4. A process according to claim 1 wherein the retention time of the syrup or juice in the reaction vessel is from ¼ to 1½ hours.

5. A process according to claim 2 wherein the temperature of the syrup or juice is between room temperature and 60°C.

* * * * *

UNITED STATES PATENT OFFICE
CERTIFICATE OF CORRECTION

Patent No. 3,836,432      Dated September 17, 1974

Inventor(s) Junichi Shimizu et al

It is certified that error appears in the above-identified patent and that said Letters Patent are hereby corrected as shown below:

IN THE HEADING:

The claimed Priority Data was omitted. Should read:

--October 7, 1968    Japan..........72676

Signed and sealed this 19th day of November 1974.

(SEAL)
Attest:

McCOY M. GIBSON JR.
Attesting Officer

C. MARSHALL DANN
Commissioner of Patents